S. J. JOHNSON, DEC'D.
S. JOHNSON, EXECUTRIX.
POWER TRANSMISSION MECHANISM.
APPLICATION FILED APR. 20, 1916.

1,305,371. Patented June 3, 1919.

Inventor
Sinclair J. Johnson.
By his Attorney
John O. Seifert

UNITED STATES PATENT OFFICE.

SINCLAIR J. JOHNSON, OF MONTCLAIR, NEW JERSEY; SARAH JOHNSON, EXECUTRIX OF THE WILL OF SAID SINCLAIR J. JOHNSON, DECEASED, ASSIGNOR OF ONE-HALF TO WALTER C. SHULTZ, OF MONTCLAIR, NEW JERSEY.

POWER-TRANSMISSION MECHANISM.

1,305,371.     Specification of Letters Patent.     Patented June 3, 1919.

Application filed April 20, 1916. Serial No. 92,442.

*To all whom it may concern:*

Be it known that I, SINCLAIR J. JOHNSON, a citizen of the United States, residing in Montclair, in the county of Essex and State of New Jersey, have invented new and useful Improvements in Power-Transmission Mechanism, of which the following is a specification.

This invention relates to power transmission mechanism to transmit motion from a driving element to a driven element in the same direction or in a direction reverse to the movement of the driving element, and it is the object of the invention to improve the general construction of a power transmission mechanism of this type which is cheap in construction, compact and efficient in operation.

In the drawing accompanying and forming a part of this specification Figure 1 is a side elevation of my improved power transmission mechanism.

Similar characters of reference designate like parts throughout the different views of the drawing.

Figure 2:
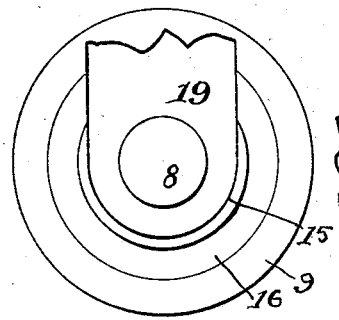
Fig. 2 is a view looking at the left of Fig. 1.
Figure 1:
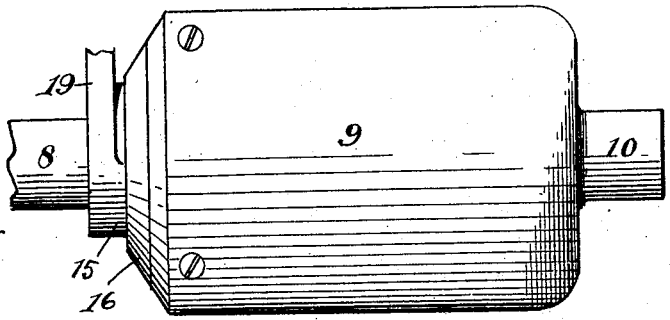
Figure 4:
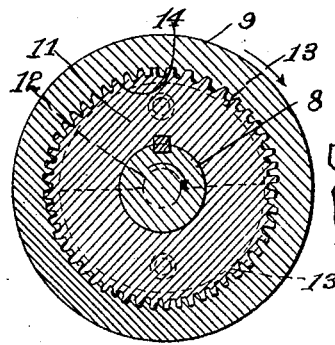
Fig. 4 is a cross sectional view taken substantially on the line A—A of Fig. 3 looking in the direction of the arrow.
Figure 3:
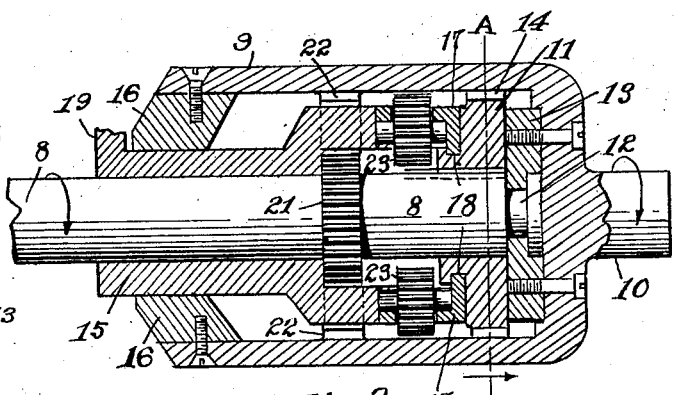
Fig. 3 is a sectional side elevation showing the parts in position when movement is imparted to the driven element in the same direction as the driving element.
Figure 6:
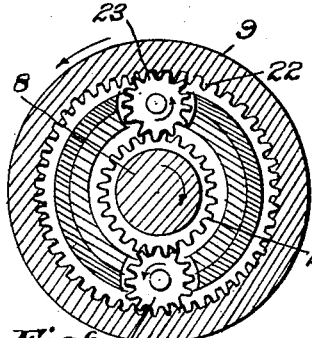
Fig. 6 is a cross sectional view taken substantially on the line B—B of Fig. 5 and looking in the direction of the arrow.
Figure 5:
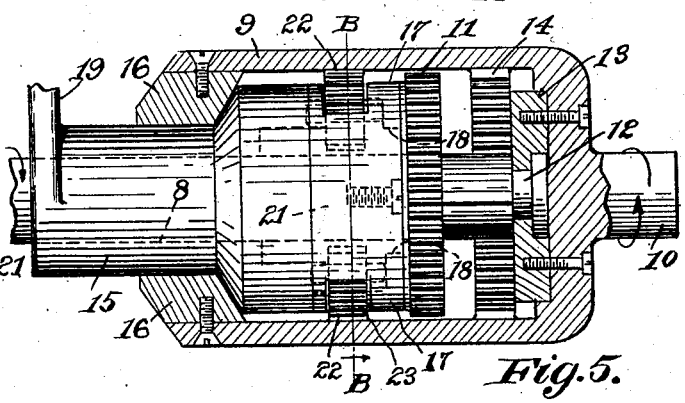
Fig. 5 is a sectional side elevation showing the parts in position when movement is imparted to the driven element in a direction reverse to the movement of the driving element.

The embodiment of my invention shown in Figs. 1 to 6 of the drawing consists of a driving element in the form of a continually rotated shaft 8 adapted to be connected to a suitable source of power. This shaft extends into a cylinder 9 to constitute a part of the driven element, the said cylinder having a cylindrical portion 10 coaxial with the shaft 8 and adapted to be connected to a driven part (not shown). To prevent axial movement of the shaft 8 and cylinder 9 but to permit them to have rotative movement independent of each other the end of the shaft 8 has an annular recess 12 and is journaled in a split bushing 13 fixed within the cylinder 9, each section having a flanged portion to engage in the annular recess of the shaft. To connect the shafts to drive the driven shaft in the same direction and at the same velocity as the driving shaft coöperative clutch mechanism is provided between said shafts. One of said clutch members in the form of a gear 11 is mounted upon the end of the shaft 8 within the cylinder 9 to rotate therewith and having sliding movement thereon. This gear is adapted to mesh with an internal gear or gear teeth 14 fixed to the cylinder and constituting the other clutch member, and whereby as the shaft 8 is rotated in the direction of the arrow the gear 11 through the internal gear 14 will couple the shaft 8 to the cylinder and thereby to the driven part. To uncouple the shaft 8 and cylinder 9 the gear 11 is adjustable longitudinally on the shaft by a shifter 15 slidably mounted upon the shaft 8 and in a collar 16 fitted into the end of the cylinder, and which collar serves to close said end. The shifter 15 has portions 17 fixed to the end thereof to engage with an annular recess 18 in the hub of the gear 11, a suitable operating handle being fixed to or constituting a part of the shifter, as shown at 19. In Fig. 4 the gear 11 is shown in mesh with the internal gear teeth 14 coupling the driving and driven elements together whereby the driven element will be moved in the same direction and at the same speed as the driving element. It will be obvious that by shifting the gear 11 to the left, as viewed from Fig. 5, the shaft 8 will be disconnected from the cylinder 9 through the gear 11.

To impart movement to the driven element in a direction reverse to the direction of movement of the driving element there is fixed to the shaft 8 within an overhanging portion of the shifter a gear 21, and an internal gear or gear teeth 22 fixed to the cylinder 9 and with which gears pinions 23 rotatably carried by the shifter 15 are adapted to mesh. The pinions 23 have oppositely extending trunnions 24 whereby they are journaled in bearings in the overhanging portion of the shifter and retained in said bearings by the portion 17 which may constitute a part of the bearings for said pinions. By imparting movement through the operating lever 19 in a direction toward the left of Figs. 3 and 5 gear 11 will be thrown out of mesh with the internal gear 14 disconnecting the shaft 8 from the casing, and the pinions 23 will be thrown into mesh with the gears 21 and 22. It will be obvious that as the shaft 8 is rotated in the direction of the arrow the cylinder 9 and connected part to be driven will be coupled to the driving shaft to be rotated in a reverse direction to said driving shaft through the pinions 23, gear 21 and internal gear 22.

Having thus described my invention I claim:

1. In a power transmission mechanism, the combination of a cylinder having a pair of internal gears, a shaft journaled in said cylinder, a gear rotatable with and slidable on the shaft adapted to be thrown into and out of mesh with one of the internal gears, a second gear fixed to the shaft, and an idler pinion adapted to be thrown into mesh with said latter gear and the other internal gear, substantially as and for the purpose specified.

2. In a power transmission mechanism, the combination of a cylinder having a pair of internal gears, a shaft journaled in said cylinder to prevent axial movement of one relative to the other; a gear rotatable with and slidable on the shaft; a shifter connected to said gear operable to throw the gear into and out of mesh with one of said internal gears; a second gear fixed to the shaft; and an idler pinion carried by the shaft and adapted to be thrown into and out of mesh with said latter gear and the other internal gear, substantially as and for the purpose specified.

3. In a power transmission mechanism, the combination of rotatable driving and driven elements, means to coaxially connect said elements to permit of rotation of one independent of the other, a pair of internal gears rotatable with one of said elements, a pair of gears rotatable with the other element, means to throw one of said gears into and out of mesh with one of the internal gears, and idler pinions adapted to be thrown into and out of mesh with the other gear and internal gear, substantially as and for the purpose specified.

4. In a power transmission mechanism, the combination of rotatable driving and driven elements coaxially connected to permit rotation of one independent of the other and prevent axial movement of said elements; an internal gear rotatable with the driven element; an axially adjustable gear rotatable with the driving element; a shifter to axially adjust said gear to throw it into and out of mesh with the internal gear; a second internal gear rotatable with the driven element; a second gear rotatable with the driving element; and idler pinions carried by the shifter adapted to be thrown into and out of mesh with the second gear and the second internal gear when the first gear is thrown out of mesh with the first internal gear, and to be thrown out of mesh with said second gear and internal gear when the first gear is thrown out of mesh with the first internal gear, substantially as and for the purpose specified.

5. In a power transmission mechanism, the combination of a rotatable shaft; a cylinder open at one end into which the shaft extends and is journaled, and having a shaft portion to extend coaxial with the shaft; means within said cylinder to coaxially connect the shaft and cylinder to permit rotary movement of one independent of the other and prevent axial movement thereof; a clutch member in the cylinder; a clutch member mounted on the shaft to rotate therewith and have sliding movement thereon adapted to be thrown into and out of operative engagement with the clutch member on the cylinder; a shifter slidably mounted on the shaft and in a collar closing the open end of the cylinder to which the clutch member on the shaft is rotatably connected; an internal gear in the cylinder; a gear fixed to the shaft; and idler pinions carried by the shifter adapted to be thrown into and out of mesh with the internal gear and the gear fixed to the shaft, substantially as and for the purpose specified.

6. In a power transmission mechanism, the combination of rotatable driving and driven elements coaxially connected to permit rotation of one independent of the other and prevent axial movement of said elements; a clutch member connected to one of said elements; a clutch member carried by the other of said elements; means to throw one of said members into and out of engagement with the other clutch member; a gear fixed to one of said elements; an internal gear fixed to the other element; and idler pinions adapted to be thrown into mesh with said gears when the clutch members are disconnected to drive the driven element in a reverse direction.

SINCLAIR J. JOHNSON.

Copies of this patent may be obtained for five cents each, by addressing the "Commissioner of Patents, Washington, D. C."